United States Patent

Cook et al.

[11] Patent Number: 5,552,648
[45] Date of Patent: Sep. 3, 1996

[54] METHOD AND APPARATUS FOR THE GENERATION OF LONG TIME CONSTANTS USING SWITCHED CAPACITORS

[75] Inventors: Thomas D. Cook, Kokomo; Eugene R. Bukowski Jr., Noblesville; Vicki J. Voorhis, Kokomo, all of Ind.

[73] Assignee: Delco Electronics Corporation, Kokomo, Ind.

[21] Appl. No.: 199,929

[22] Filed: Feb. 22, 1994

[51] Int. Cl.$^6$ ............................................. H02M 3/06
[52] U.S. Cl. ........................... 307/125; 307/109; 307/112
[58] Field of Search ................................. 307/108, 109, 307/110, 112, 113, 116, 125; 363/59, 60, 61; 320/1

[56] References Cited

U.S. PATENT DOCUMENTS

| | | | |
|---|---|---|---|
| 4,302,804 | 11/1981 | Bader | 363/60 |
| 4,679,134 | 7/1987 | Bingham et al. | 363/61 |
| 4,754,226 | 6/1988 | Lusignan et al. | 328/158 |
| 4,797,899 | 1/1989 | Fuller et al. | 375/7 |
| 4,802,739 | 2/1989 | Iwamoto | 350/332 |
| 4,806,874 | 2/1989 | Michel | 330/9 |
| 5,293,169 | 3/1994 | Baumgartner et al. | 341/172 |

*Primary Examiner*—William M. Shoop, Jr.
*Assistant Examiner*—Jonathan S. Kaplan
*Attorney, Agent, or Firm*—Jimmy L. Funke

[57] ABSTRACT

A switched capacitor (12) providing an effective resistance having a relatively long time constant. The switched capacitor (12) includes a technique for switching an input switch (14) associated with the capacitor (12) between a first input potential and a second input potential where the second input potential is proportional to the first input potential. In one specific implementation, the capacitor is a primary capacitor (30) having a three position input switch (46) that is switchable between a ground contact (48), an intermediate contact (42) and the input potential, and a three position output switch (50) that is switchable between a first ground contact (56), a second ground contact (54) and an output potential. A secondary capacitor (32) includes a two position input switch (34) that is switchable between the input voltage and a ground contact (38), and an output switch (40) that is switchable between a ground contact (44) and the intermediate contact (42). The clocking frequency of the primary capacitor (30) enables the input switch (46) to be switched from the ground contact (48) to the intermediate contact (42) to the input voltage. When the input switch (46) of the primary capacitor (30) is connected to the intermediate contact (42), the secondary capacitor (32) is repeatedly switched between the input voltage and ground in order to provide the proportional input voltage. The number of times that the secondary capacitor (32) is switched when the primary capacitor (30) is connected to the intermediate contact (42) and the ratio of the capacitances of the capacitors (30, 32) determines the effective resistance.

4 Claims, 1 Drawing Sheet

METHOD AND APPARATUS FOR THE GENERATION OF LONG TIME CONSTANTS USING SWITCHED CAPACITORS

BACKGROUND OF THE INVENTION

1. Field of the Invention

This invention relates generally to a switched capacitor and, more particularly, to a switched capacitor including a technique for switching the input of the switched capacitor between an input potential and a potential proportional to the input potential so as to increase the effective resistance.

2. Discussion of the Related Art

A switched capacitor is a capacitor, well known in the art, that is rapidly switched between different voltage potentials in order to repeatedly charge and discharge the capacitor so as to mimic a resistor. The typical prior art switched capacitor includes an associated input switch and output switch where the input switch is switched between an input potential and a ground potential, and the output switch is switched between an output potential and a ground potential at the same switching rate (see FIG. 1). In an integrated circuit application, the input and output switches are generally metal oxide field effect transistors. For a more complete background discussion of switched capacitors, see for example, Gregorian & Temes, "ANALOG MOS INTEGRATED CIRCUITS" Wiley-Interscience 1986.

Switched capacitors provide a number of advantages for integrated circuit applications. When fabricating an integrated circuit, resistors having accurate resistive values are sometimes difficult to achieve. Additionally, integrated circuit resistors having relatively large values are sometimes impractical to implement. An integrated circuit switched capacitor can be fabricated to provide accurate resistive values and can significantly reduce the chip area required by eliminating high value resistors and the requirement for off-chip resistors.

Another advantage in replacing resistors with switched capacitors is the ability to more closely match the resistive and capacitive components in order to provide a more reliable time constant of an integrated circuit. Because the resistors and capacitors of an integrated circuit are fabricated at different times during the fabrication process, the ability to match the values of these components so as to achieve a predictable time constant of the circuit is difficult. Therefore, a predictable time constant of the circuit cannot be accurately determined in that the time constant may have a wide range of error. As is well understood, this variance in time constants of an electrical circuit becomes a significant problem in certain applications.

Switched capacitors have been effective in matching resistive and capacitive components so as to narrow the predictable time constant of a particular electrical circuit. However, in order to generate relatively long time constants, high resistances are required. The effective resistance which can be established by a switched capacitor is limited by the switching frequency of the switches and the smallest practical capacitor size. A higher effective resistance is achieved by reducing the switching frequency and/or reducing the capacitor size. Therefore, the effective resistance is limited by practical switching frequencies and capacitor fabrication techniques.

The above described limitations present a significant drawback to switched capacitor technology for systems having relatively long time constants. What is needed then is a technique for increasing the effective resistance of a switched capacitor in order to realize these longer time constants. It is therefore an object of the present invention to provide such a switched capacitor.

SUMMARY OF THE INVENTION

In accordance with the teaching of the present invention, a switched capacitor is disclosed which provides an effective resistance capable of generating relative long time constants. In order to provide this effective resistance, an input switch associated with a capacitor of the switched capacitor is switched between an input potential and a proportional potential to the input potential. An output switch associated with the capacitor is switched between an output voltage potential and a ground potential at the same switching frequency as the input switch. By varying the proportional potential of the input potential, the effective resistance can be changed. The closer the proportional potential gets to the input potential, the higher the effective resistance becomes at a common switching frequency.

In one particular implementation, the switched capacitor includes two capacitors. A primary capacitor has a three position input switch and a three position output switch. The three position input switch switches the primary capacitor from a ground potential contact, to an intermediate contact and then to an input potential contact in accordance with a primary capacitor clock switching frequency. The three position output switch switches the output of the primary capacitor from a first ground potential contact, to a second ground potential contact, and then to an output potential contact in accordance with the primary capacitor clock switching frequency.

A secondary capacitor includes a two position input switch and a two position output switch. The input switch switches the input of the secondary capacitor from the input voltage potential contact to a ground potential contact in accordance with a secondary capacitor clock switching frequency. The output switch switches the output of the secondary capacitor from the intermediate contact to a ground potential contact also in accordance with the secondary capacitor clock switching frequency. When the primary capacitor is connected to the intermediate contact and the ground potential contact during the second clock phase of the switching frequency of the primary capacitor, the input and output switches of the secondary capacitor are being repeatedly switched such that the secondary capacitor is being charged and discharged. The number of times that the secondary capacitor switches during the time that the primary capacitor is at the intermediate contact location sets the proportional voltage potential, and therefore determines the effective resistance.

Additional objects, advantages, and features of the present invention will become apparent from the following description and dependent claims, taken in conjunction with the accompanying drawings.

DETAILED DESCRIPTION OF THE PREFERRED EMBODIMENTS

The following discussion of the preferred embodiments concerning switched capacitors is merely exemplary in nature and is in no way intended to limit the invention or its application or uses.

Figure 1:
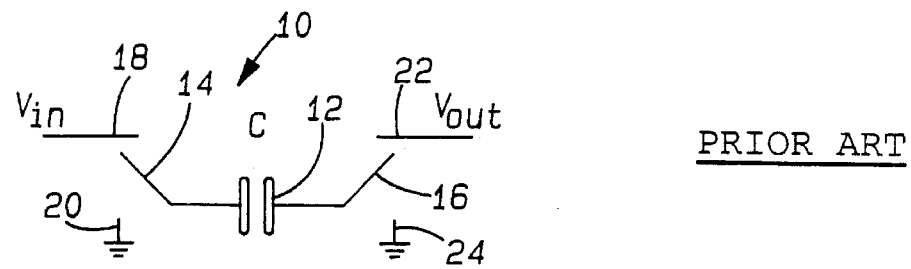
FIG. 1 is a schematic diagram of a prior art switched capacitor resistor.

Turning to FIG. 1, a prior art switched capacitor resistor 10 is shown. The switched capacitor resistor 10 includes a capacitor 12 that is connected between an input switch 14 and an output switch 16, as shown. The input switch 14 alternately connects the capacitor 12 between an input voltage potential ($V_{IN}$) contact 18 and a ground potential contact 20, and the output switch 16 alternately connects the capacitor 12 between an output voltage potential ($V_{OUT}$) contact 22 and a ground potential contact 24 at a particular clock switching frequency. In a practical environment, the switched capacitor resistor 10 is part of an integrated circuit (not shown), and the switches 14 and 16 are integrated metal oxide semiconductor field effect transistors (MOSFET).

A first clock signal from a clocking circuit (not shown) will orient the switches 14 and 16 such that the capacitor 12 is connected to an input and an output circuit as depicted by the voltage potentials $V_{IN}$ and $V_{OUT}$, respectively, so that the capacitor 12 is charged. In order to simplify the discussion, it is assumed that the output potential $V_{OUT}$ is connected to a virtual ground, such as the input of an operational amplifier. During the first clock phase of the clock switching frequency, the charge accumulated on the capacitor 12 is given by:

$$Q_C = CV_{IN} \quad (1)$$

where $Q_C$ is the charge on the capacitor 12 and C is the capacitance of the capacitor 12.

A second clock signal from the clocking circuit will cause the switches 14 and 16 to be oriented such that the capacitor 12 is connected across a ground potential, and thus will be discharged. During the second clock phase, the total charge transfer from the capacitor 12 is given by:

$$\Delta Q_C = CV_{IN} \quad (2)$$

The switches 14 and 16 will be repetitively and rapidly switched back and forth in this manner so that the capacitor is rapidly charged and discharged.

If both sides of equation (2) are divided by the time period $\Delta T$ for which the charge transfer occurs, i.e., the duration of the second clock phase, the approximate average current i through the capacitor 12 is given by:

$$i \cong \frac{\Delta Q_c}{\Delta T} = \frac{C}{\Delta T} V_{IN} \quad (3)$$

After some mathematical manipulation, equation (3) can be represented by:

$$R = \frac{V_{IN}}{i} = \frac{1}{f_{clk}C} \quad (4)$$

where R is resistance and $f_{clk}$ is the switching frequency of the switches 14 and 16. Equation (4) shows that the effective resistance R of a switched capacitor resistor is determined by the size (capacitance) of the capacitor 12 and the clocking frequency that controls the switches 14 and 16. Equation (3) is an approximation, however, and in practice the capacitor 12 acts as a resistor only at frequencies much lower than the clock frequencies.

The upper limit of the effective resistance is determined by the lowest practical clocking frequency and the lowest capacitance which can effectively be fabricated. At high temperatures, such as would be present for example in an automotive environment, diffusion in MOSFET switches will cause some DC leakage. At low clocking frequencies, this leakage degrades the performance of a switched capacitor resistor. For current technologies, a lower limit of 50 kHz for the switching frequency is practical. The smallest practical capacitor size is limited by the parasitic capacitance of the input circuit. At present, this capacitor size is about 1 pF. The combination of this switching frequency and capacitor size provides an upper limit on the effective resistance of about 20MΩ. However, time constants on the order of 10 ms are desirable in many applications. Such a time constant would require a integrating capacitor size of 500 pF at the lowest practical clocking frequency.

Figure 2:
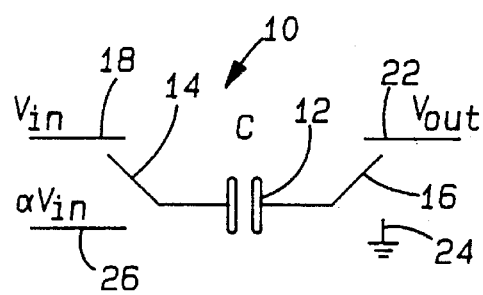
FIG. 2 is a schematic diagram of a switched capacitor resistor according to one preferred embodiment of the present invention.

In accordance with the teachings of the present invention, the limitations discussed above can be overcome by replacing the ground potential connected to the switch 14 in FIG. 1 during the second clock phase with a proportion of $V_{IN}$. This modification is shown in FIG. 2 in which the ground contact 20 is replaced with a voltage potential ($\alpha V_{IN}$) contact 26. During the second clock phase, when the switches 14 and 16 switch away from $V_{IN}$ and $V_{OUT}$, the capacitor 12 is discharged to a second voltage $\alpha V_{IN}$ that is proportional to the input voltage $V_{IN}$. The charge on the capacitor 12 is therefore given by:

$$Q_C = C \alpha V_{IN} \quad (5)$$

The total charge transferred in this example is therefore given by:

$$\Delta Q_C = CV_{IN}(1-\alpha) \quad (6)$$

By performing the same manipulations as discussed above to arrive at equation (3), the current i and the resistance R can be represented by:

$$i \cong \frac{\Delta Q_c}{\Delta T} = \frac{C(1-\alpha)}{\Delta T} V_{IN}; \text{ and} \quad (7)$$

$$R = \frac{V_{IN}}{i} = \frac{1}{f_{clk}C(1-\alpha)} \quad (8)$$

The effective resistance value given by R can therefore be changed by varying the proportionality constant $\alpha$. As $\alpha$ approaches 1, the value of R approaches an open circuit.

Figure 3:
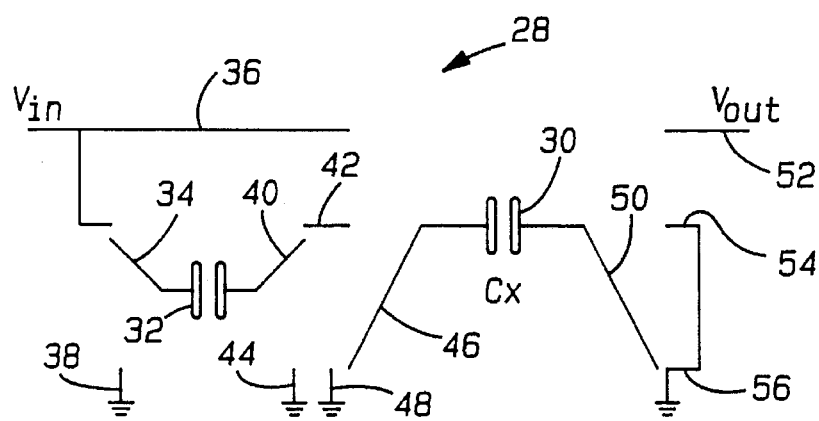
FIG. 3 is a switched capacitor resistor according to another preferred embodiment of the present invention.

The proportionality constant $\alpha$ is selected so that the advantages of switched capacitor design performance parameters which are dependent on capacitor ratios and clock switching frequencies are maintained. A switched capacitor resistor circuit 28, according to a preferred embodiment of the present invention, for providing a practical application of a switched capacitor resistor is shown in FIG. 3. The circuit 28 includes a primary capacitor 30 and a secondary capacitor 32. The primary capacitor 30 is equivalent to the capacitor 12 of FIG. 1, and the secondary capacitor 32 is used to generate the proportionality constant $\alpha$ discussed above. This design generates the proportionality constant $\alpha$ while at the same time provides design performance parameters which are dependent only on capacitor ratios and clock frequency.

A two position input switch 34 causes the input of the secondary capacitor 32 to be switched between an input potential $V_{IN}$ contact 36 and a ground potential contact 38 in accordance with a secondary clock switching frequency. Additionally, a two position output switch 40 causes the output of the capacitor 32 to be switched from an intermediate contact 42 to a ground potential contact 44 in accordance with the secondary clock switching frequency. Therefore, when the input switch 34 is connected to the input potential $V_{IN}$ contact 36, the output switch 40 is connected to the intermediate contact 42, and the capacitor 32 is being charged. When the input switch 34 and the output switch 40 are connected to the ground potential contacts 38 and 44, respectively, the capacitor 32 is discharged.

A three position input switch 46 causes the input of the primary capacitor 30 to be switched between the input potential $V_{IN}$ contact 36, the intermediate contact 42 and a ground potential contact 48 in accordance with a primary clock switching frequency. Additionally, a three position output switch 50 causes the output of the capacitor 30 to be switched between an output potential $V_{OUT}$ contact 52 and first and second ground potential contacts 54 and 56 in accordance with the primary clock switching frequency.

During a first clock phase for the capacitor 30, the switches 46 and 50 are switched to the ground contacts 48 and 56, respectively, as shown in FIG. 3, and the primary capacitor 30 is discharged. At a second clock phase for the capacitor 30, the switch 46 is switched to be in contact with the intermediate contact 42 and the switch 50 is switched to be in contact with the ground contact 54. During the second clock phase of the capacitor 30, the input switch 34 of the capacitor 32 is being repeatedly connected to the input potential $V_{IN}$ contact 36 and the ground contact 38 in accordance with the clock switching frequency of the capacitor 32. The output switch 40 is being repeatedly connected to the intermediate contact 42 and the ground contact 44 in accordance with the input switch 34. The charge which the capacitor 30 obtains when it is in its second position is therefore controlled by the number of times the capacitor 32 is switched and the ratio of the two capacitors 30 and 32. During a third clock phase, the capacitor 30 is connected to the input potential $V_{IN}$ contact 36 and the output potential $V_{OUT}$ contact 52 to be charged. The next clock phase of the primary capacitor switching frequency will cause the capacitor 30 to be connected to the intermediate contact 42 and the ground potential contact 54 to be discharged to the proportional voltage.

The value of the proportionality constant $\alpha$ can be controlled by the ratio of the capacitors 30 and 32 and the number of times the capacitor 32 is switched during the second clock phase of the primary capacitor switching frequency. If the capacitor 32 is switched once during the second clock phase, the voltage applied to the capacitor 30 at the end of the second clock phase will be given by:

$$V_{A1} = \frac{C_L}{C_L + C_X} V_{IN}' \qquad (9)$$

where $C_x$ is the capacitance of the capacitor 30, $C_L$ is the capacitance of the capacitor 32, and $V_{A1}$ is the voltage on the capacitor 30. The "1" indicates that the capacitor 32 has switched once. If the capacitor 32 has been switched twice, the voltage on the capacitor 30 at the end of the second clock phase will be given by:

$$\begin{aligned} V_{A2} &= \frac{C_L}{C_L + C_X} (V_{IN} - V_{A1}) + V_{A1} \\ &= MV_{IN} + NV_{A1} \\ &= MV_{IN}(1+N) \end{aligned} \qquad (10)$$

Where: $M = \frac{C_L}{C_L + C_X}$, and $N = 1 - M$

Equation (10) can be generalized to n number of switches by:

$$V_{AN} = V_{IN} M(1+N+N^2+ \ldots +N^n). \qquad (11)$$

From this it is apparent that the proportionality constant $\alpha$ is given by:

$$\alpha = M(1+N+N^2+ \ldots +N^n). \qquad (12)$$

The above switched capacitor technique has many applications, especially for circuits incorporating relatively long time constants. In one particular application the switched capacitor circuit 28 in FIG. 3 was utilized in a Tow-Thomas bi-quad low pass filter. A Tow-Thomas biquad low pass filter is a well known low pass filter incorporation switched capacitors.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A switched capacitor resistor comprising:

a first capacitor, said first capacitor including a first terminal and a second terminal;

a first switch electrically connected to the first terminal of the first capacitor:

means for applying a first input potential to the first capacitor when the first switch is in a first input position in order to charge the capacitor and bring the first terminal to the first input potential;

means for applying a second input potential to the first capacitor when the first switch is in a second input position, said second input potential being proportional to the first input potential and between the first input potential and ground potential in order to discharge the capacitor and bring the first terminal to the second input potential, wherein the first switch is switched between the first position and the second position in accordance with a first capacitor switching frequency;

a second switch electrically connected to the second terminal of the first capacitor;

means for applying an output potential to the second switch of the first capacitor when the first switch is in the first position; and means for applying a ground potential to the second switch when the first switch is in the second position.

2. A switched capacitor resistor comprising:

a first capacitor, said first capacitor including an input terminal and an output terminal;

a second capacitor, said second capacitor including an input terminal and an output terminal;

a first switch electrically connected to the input terminal of the first capacitor, said first switch operable to switch the input of the first capacitor between a first position, a second position and a third position, wherein a first input potential is applied to the input terminal of the first capacitor when the first switch is in the first position, and a second input potential is applied to the input terminal of the first capacitor when the first switch is in the second position, said second input potential being proportional to the first input potential;

a second switch electrically connected to the output terminal of the first capacitor, said second switch operable to switch the output of the first capacitor between a first position, a second position and a third position, wherein an output potential is applied to the output terminal of the first capacitor when the second switch is in the first position;

a third switch electrically connected to the input terminal of the second capacitor, said third switch operable to switch the input of the second capacitor between a first position and a second position, wherein the first input potential is applied to the input terminal of the second capacitor when the third switch is in the first position; and a fourth switch electrically connected to the output terminal of the second capacitor, said fourth switch operable to switch the output of the second capacitor between a first position and a second position, said first position of the fourth switch being electrically connected to the second position of the first switch;

wherein the first and second switches are switched in unison in accordance with a first switching frequency in order to charge and discharge the first capacitor, and the third and fourth switches are switched in unison in accordance with a second switching frequency in order to charge and discharge the second capacitor such that when the first and second switches are in the second position, the third and fourth switches are being switched between their first and second positions in order to provide the second input potential to the first capacitor, said second input potential being set by a number of times the third and fourth switches are switched when the first switch is in the second position and a ratio of the capacitance of the first capacitor and the capacitance of the second capacitor.

3. The switched capacitor resistor according to claim 2 wherein a ground potential is applied to each of the input terminal of the first capacitor when the first switch is in the third position, the output terminal of the first capacitor when the second switch is in the second and third positions, the input terminal of the second capacitor when the third switch is in the second position, and the output terminal of the second capacitor when the fourth switch is in the second position.

4. A switched capacitor resistor comprising:

a first capacitor, said first capacitor including a first terminal and a second terminal:

a first switch electrically connected to the first terminal of the first capacitor;

means for applying a first input potential to the first capacitor when the first switch is in a first input position in order to charge the capacitor and bring the first terminal to the first input potential;

means for applying a second input potential to the first capacitor when the first switch is in a second input position, said second input potential being proportional to the first input potential in order to discharge the capacitor and bring the first terminal to the second input potential, wherein the first switch is switched between the first position and the second position in accordance with a first capacitor switching frequency;

a second switch electrically connected to the second terminal of the first capacitor;

means for applying a ground potential to the first switch of the first capacitor when the first switch is in a third position;

means for applying a output potential to the second switch of the first capacitor when the first switch is in the first position; and means for applying a ground potential to the second switch of the first capacitor when the first switch of the first capacitor is in the second and third positions.

* * * * *